(12) United States Patent
Mentovich et al.

(10) Patent No.: US 12,392,976 B2
(45) Date of Patent: Aug. 19, 2025

(54) OPTOELECTRONIC COMPONENT AND METHOD OF MANUFACTURING AN OPTOELECTRONIC COMPONENT

(71) Applicant: MELLANOX TECHNOLOGIES, LTD., Yokneam (IL)

(72) Inventors: Elad Mentovich, Tel Aviv (IL); Paraskevas Bakopoulos, Ilion (GR); Boaz Atias, Maale Adumim (IL); Anna Sandomirsky, Yokneam (IL); James Stephen Fields, Jr., Santa Fe, NM (US); Dimitrios Kalavrouziotis, Papagou (GR)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 234 days.

(21) Appl. No.: 17/660,348

(22) Filed: Apr. 22, 2022

(65) Prior Publication Data
US 2023/0305250 A1    Sep. 28, 2023

(30) Foreign Application Priority Data
Mar. 23, 2022  (GR) ................................. 0220100257

(51) Int. Cl.
  *G02B 6/43*  (2006.01)
  *G02B 6/42*  (2006.01)

(52) U.S. Cl.
  CPC .............. *G02B 6/43* (2013.01); *G02B 6/428* (2013.01)

(58) Field of Classification Search
  CPC ......... G02B 6/43; G02B 6/428; G02B 6/4279
  USPC .......................................... 385/14–15, 24, 31
  See application file for complete search history.

(56) References Cited

U.S. PATENT DOCUMENTS

| 2014/0203175 A1* | 7/2014 | Kobrinsky | ........... G02B 6/4214 |
| | | | 250/214.1 |
| 2016/0062063 A1* | 3/2016 | Ogura | .................... G02B 6/305 |
| | | | 264/1.27 |
| 2016/0216445 A1* | 7/2016 | Thacker | ................ G02B 6/4219 |
| 2017/0363823 A1* | 12/2017 | Mentovich | ............. G02B 6/428 |

(Continued)

*Primary Examiner* — Tina Wong
(74) *Attorney, Agent, or Firm* — Michael M. McCraw; Moore & Van Allen PLLC

(57) ABSTRACT

An optoelectronic component may include a substrate, an electronic integrated circuit supported by the substrate, and a photonic integrated circuit supported by the substrate. The optoelectronic component may include a plurality of substrate interconnect connectors disposed on the substrate, a plurality of electronic integrated circuit interconnect connectors disposed on the electronic integrated circuit, and a plurality of photonic integrated circuit interconnect connectors disposed on the photonic integrated circuit. The optoelectronic component may include a first plurality of cable connectors, each cable connector connected to the substrate, the electronic integrated circuit, and the photonic integrated circuit via respective interconnect connectors. The first plurality of cable connectors may be configured to facilitate electrical communication between the substrate, the electronic integrated circuit, and the photonic integrated circuit. The first plurality of cable connectors may define a first layout, and an overall connectivity of the optoelectronic component may correspond to the first layout.

23 Claims, 5 Drawing Sheets

(56) References Cited

U.S. PATENT DOCUMENTS

| | | | |
|---|---|---|---|
| 2020/0183085 A1* | 6/2020 | Mentovich | G02B 6/1223 |
| 2022/0264759 A1* | 8/2022 | Sawyer | G06F 1/20 |

* cited by examiner

OPTOELECTRONIC COMPONENT AND METHOD OF MANUFACTURING AN OPTOELECTRONIC COMPONENT

CROSS-REFERENCE TO RELATED APPLICATIONS

This application claims priority to Greek Patent Application No. 20220100257, filed Mar. 23, 2022, the content of which is hereby incorporated by reference herein in its entirety.

TECHNOLOGICAL FIELD

Example embodiments of the present disclosure relate generally to high speed circuits and, more particularly, to an optoelectronic component with interchangeable cable connectors.

BACKGROUND

Applicant has identified a number of deficiencies and problems associated with high speed circuits. Through applied effort, ingenuity, and innovation, many of these identified problems have been solved by developing solutions that are included in embodiments of the present disclosure, many examples of which are described in detail herein.

BRIEF SUMMARY

In an embodiment, an optoelectronic component is provided. In some embodiments, the optoelectronic component may include a substrate. In some embodiments, the optoelectronic component may include an electronic integrated circuit supported by the substrate. In some embodiments, the optoelectronic component may include a photonic integrated circuit supported by the substrate. In some embodiments, the optoelectronic component may include a plurality of substrate interconnect connectors disposed on the substrate. In some embodiments, the optoelectronic component may include a plurality of electronic integrated circuit interconnect connectors disposed on the electronic integrated circuit. In some embodiments, the optoelectronic component may include a plurality of photonic integrated circuit interconnect connectors disposed on the photonic integrated circuit. In some embodiments, the optoelectronic component may include a first plurality of cable connectors, each cable connector connected to the substrate, the electronic integrated circuit, and the photonic integrated circuit via respective interconnect connectors. In some embodiments, the first plurality of cable connectors is configured to facilitate electrical communication between the substrate, the electronic integrated circuit, and the photonic integrated circuit. In some embodiments, the first plurality of cable connectors defines a first layout. In some embodiments, an overall connectivity of the optoelectronic component corresponds to the first layout.

In some embodiments, the substrate is a printed circuit board.

In some embodiments, the first plurality of cable connectors is flexible.

In some embodiments, the photonic integrated circuit comprises graphene.

In some embodiments, the electronic integrated circuit comprises a digital signal processor.

In some embodiments, the photonic integrated circuit comprises one of a transmitter optical sub assembly or a receiver optical sub assembly.

In some embodiments, a second plurality of cable connectors is used in place of the first plurality of cable connectors to define a second layout. In some embodiments, the overall connectivity of the optoelectronic component corresponds to the second layout In some embodiments, the plurality of electronic integrated circuit interconnect connectors has a first pitch and the plurality of photonic integrated circuit interconnect connectors has a second pitch. In some embodiments, the first pitch is different from the second pitch.

In some embodiments, the electronic integrated circuit has a first height and the photonic integrated circuit has a second height. In some embodiments, the first height and the second height are different.

In some embodiments, each of the plurality of substrate interconnect connectors, the plurality of electronic integrated circuit interconnect connectors, and the plurality of photonic integrated circuit interconnect connectors is flexible.

In another embodiment, a method of manufacturing an optoelectronic component is provided. In some embodiments, the method may include providing a substrate. In some embodiments, the method may include supporting an electronic integrated circuit on the substrate. In some embodiments, the method may include supporting a photonic integrated circuit on the substrate. In some embodiments, the method may include disposing a plurality of substrate interconnect connectors on the substrate. In some embodiments, the method may include disposing a plurality of electronic integrated circuit interconnect connectors on the electronic integrated circuit. In some embodiments, the method may include disposing a plurality of photonic integrated circuit interconnect connectors on the photonic integrated circuit. In some embodiments, the method may include providing a first plurality of cable connectors. In some embodiments, the method may include connecting each cable connector to the substrate, the electronic integrated circuit, and the photonic integrated circuit via respective interconnect connectors. In some embodiments, the first plurality of cable connectors is configured to facilitate electrical communication between the substrate, the electronic integrated circuit, and the photonic integrated circuit. In some embodiments, the first plurality of cable connectors defines a first layout. In some embodiments, an overall connectivity of the optoelectronic component corresponds to the first layout.

In some embodiments, the substrate is a printed circuit board.

In some embodiments, the first plurality of cable connectors is flexible.

In some embodiments, the photonic integrated circuit comprises graphene.

In some embodiments, the electronic integrated circuit comprises a digital signal processor.

In some embodiments, the photonic integrated circuit comprises one of a transmitter optical sub assembly or a receiver optical sub assembly.

In some embodiments, a second plurality of cable connectors is used in place of the first plurality of cable connectors to define a second layout. In some embodiments, the overall connectivity of the optoelectronic component corresponds to the second layout.

In some embodiments, the plurality of electronic integrated circuit interconnect connectors has a first pitch and the plurality of photonic integrated circuit interconnect connectors has a second pitch. In some embodiments, the first pitch is different from the second pitch.

In some embodiments, the electronic integrated circuit has a first height and the photonic integrated circuit has a second height. In some embodiments, the first height and the second height are different.

In some embodiments, each of the plurality of substrate interconnect connectors, the plurality of electronic integrated circuit interconnect connectors, and the plurality of photonic integrated circuit interconnect connectors is flexible.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
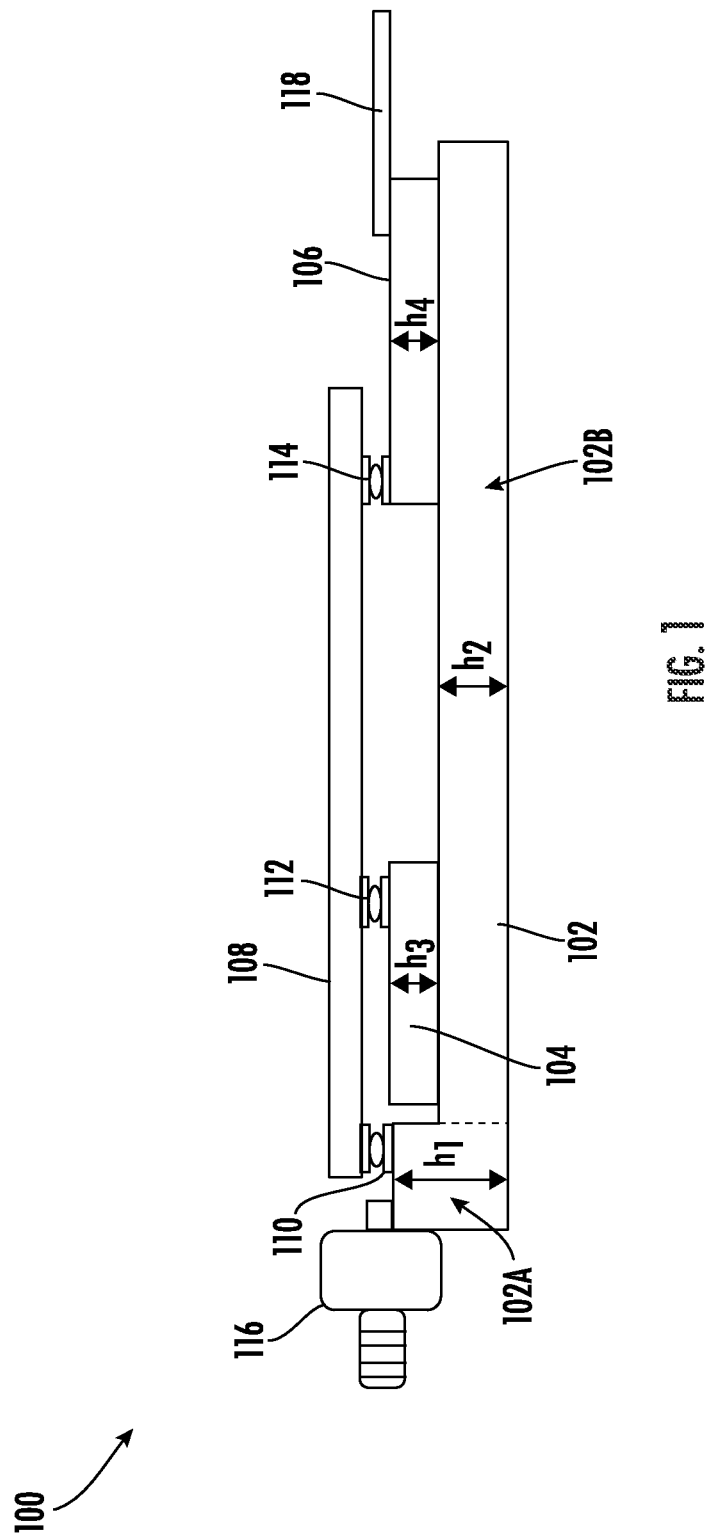
FIG. 1 illustrates a cross-sectional view of an optoelectronic component in accordance with one or more embodiments of the present invention.

High speed circuits include circuits in which the performance of the circuit is affected by the physical characteristics of the circuit. In such circuits, the density of components (e.g., chips, traces, and/or wire bonds) is often limited because, if the components are too densely packed together, the components may affect each other and reduce the performance of the circuit. Due to the limited density, high speed circuits often have limited capabilities because only a limited number of components can be fit onto the circuit. This in turn increases the cost of designing and implementing high-speed circuits because often multiple unique circuits must be created to obtain all desired capabilities.

To address the above identified issues with high speed circuits, the inventors have developed an optoelectronic component (e.g., a high speed circuit) that overcomes the density challenges of high speed circuits and enables a single high speed circuit to have increased capabilities. According to embodiments described herein, an optoelectronic component is provided that includes an electronic integrated circuit and a photonic integrated circuit that are supported by a substrate. A plurality of cable connectors may connect and facilitate communication between the substrate, electronic integrated circuit, and photonic integrated circuit via a plurality of interconnect connectors disposed on the substrate, the electronic integrated circuit, and the photonic integrated circuit. The plurality of cable connectors may define a layout that defines the overall connectivity of the optoelectronic component. The plurality of cable connectors may be interchangeable with other pluralities of cable connectors that define other, different layouts such that the overall connectivity of the optoelectronic component may be altered based on the specific layout of the connected cable connectors. As a result, by interchanging different cable connector layouts, the optoelectronic component may be dynamically modified to obtain different desired capabilities from the optoelectronic component. Additionally, in one embodiment, the plurality of cable connectors may be flexible such that the cable connectors may compensate for various fabrication and assembly tolerances as well as be able to adapt to differences in height and pitch between different substrates, electronic integrated circuits, and photonic integrated circuits.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Optoelectronic Component

Figure 2:
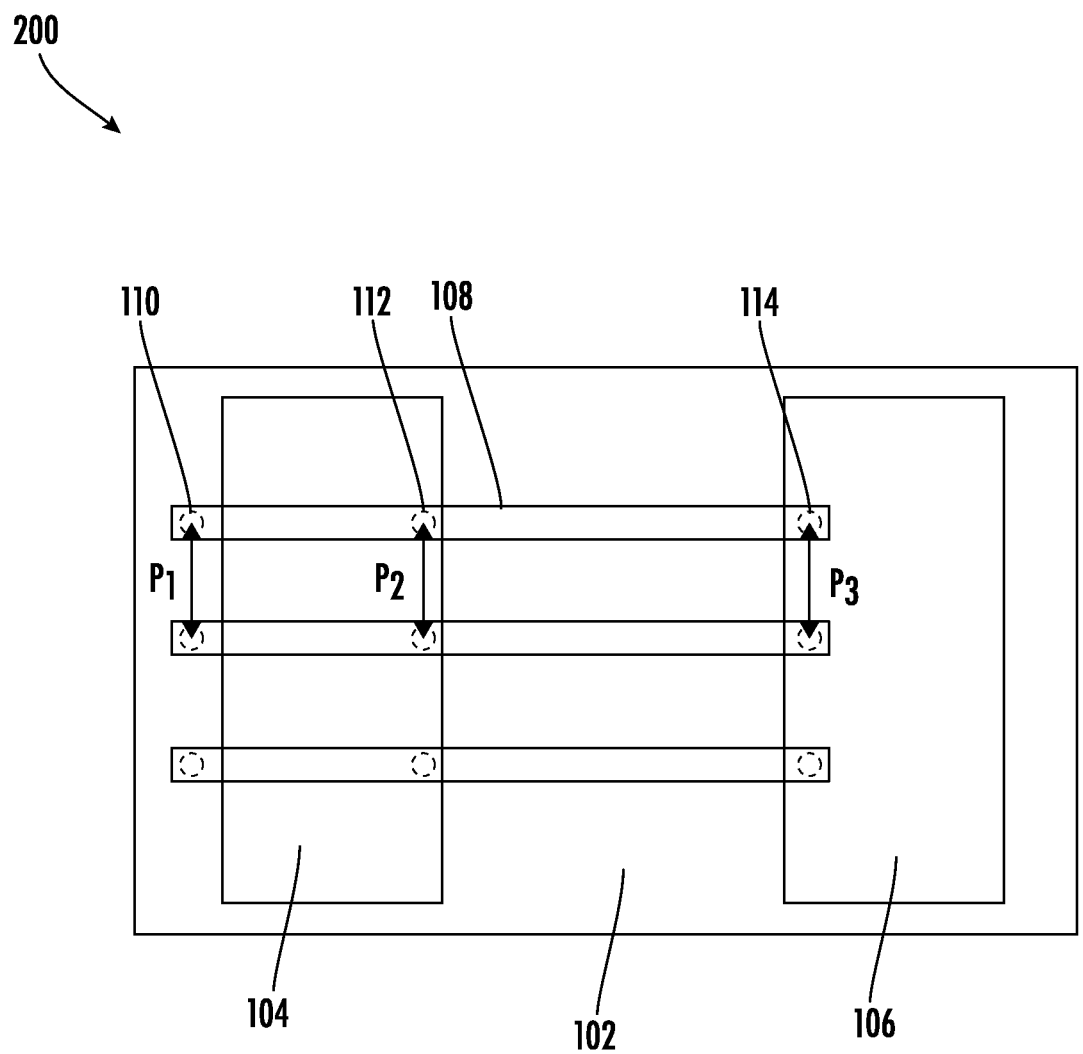
FIG. 2 illustrates a top plan view of the optoelectronic component in accordance with one or more embodiments of the present invention.

With reference to FIGS. 1 and 2, a cross-sectional view and a top plan view, respectively, of an optoelectronic component 100 are illustrated. In some embodiments, the optoelectronic component 100 may include a substrate 102. The substrate 102, for example, may be a printed circuit board, a metal carrier, an organic carrier, and/or a ceramic carrier. In some embodiments, the height of the substrate 102 may vary. In this regard, for example, a first portion 102A of the substrate 102 may have a height h1 and a second portion 102B of the substrate 102 may have a height h2. In some embodiments, an electronic integrated circuit 104 may be supported by the substrate 102. The electronic integrated circuit 104 may be any type of electronic integrated circuit. For example, the electronic integrated circuit 104 may be a digital signal processor, a modulator driver, and/or a transimpedance amplifier. In some embodiments, there may be more than one electronic integrated circuit supported by the substrate 102. In some embodiments, the electronic integrated circuit 104 may have a height h3. In some embodiments, the optoelectronic component 100 may support more than one electronic integrated circuit. In some embodiments, a photonic integrated circuit 106 may be supported by the substrate 102. The photonic integrated circuit 106 may be any type of photonic integrated circuit. For example, the photonic integrated circuit 106 may be an electro-optic modulator, a photodiode, a transmitter optical sub assembly and/or a receiver optical sub assembly. In some embodiments, the photonic integrated circuit 106 may comprise graphene. In some embodiments, there may be more than one photonic integrated circuit supported by the substrate 102. In some embodiments, the photonic integrated circuit 106 may have a height h4. In some embodiments, the heights h1, h2, h3, and h4 may be different. For example, depending on the electronic integrated circuit and photonic integrated circuit used, the height h3 may be greater that the height h4, or vice versa.

In some embodiments, the optoelectronic component 100 may include one or more optical fibers 118 connected to the photonic integrated circuit 106. The one or more optical fibers 118 may be configured to connect the optoelectronic component 100 to other optical components and/or devices. In some embodiments, a port 116 may be connected to the substrate 102. The port 116 may be configured to connect the optoelectronic component 100 to other electronic components and/or devices. In some embodiments, the optoelectronic component 100 may be configured to operate at speeds greater than 25 Gb/s.

The optoelectronic component 100 may include a plurality of substrate interconnect connectors 110 disposed on the substrate 102, a plurality of electronic integrated circuit interconnect connectors 112 disposed on the electronic integrated circuit 104, and a plurality of photonic integrated circuit interconnect connectors 114 disposed on the photonic integrated circuit 106. The plurality of substrate interconnect connectors 110, the plurality of electronic integrated circuit interconnect connectors 112, and the plurality of photonic integrated circuit interconnect connectors 114 may comprise any conductive material (e.g., conductive glue and/or solder). In some embodiments, the plurality of substrate interconnect connectors 110, the plurality of electronic integrated circuit interconnect connectors 112, and the plurality of photonic integrated circuit interconnect connectors 114 may be flexible. In other words, in some embodiments, the plurality of substrate interconnect connectors 110, the plurality of electronic integrated circuit interconnect connectors 112, and the plurality of photonic integrated circuit interconnect connectors 114 may be manipulated such that each may be capable of taking various shapes. In some embodiments, the plurality of substrate interconnect connectors 110 may have a pitch p1, the plurality of electronic integrated circuit interconnect connectors 112 may have a pitch p2, and the plurality of photonic integrated circuit interconnect connectors 114 may have a pitch p3. The pitch may refer to the distance between each of the plurality of interconnect connectors. In some embodiments, the pitch p1, pitch p2, pitch p3, may be different. For example, the pitch p2 of the plurality of electronic integrated circuit interconnect connectors 112 may be 1.25 mm while the pitch p3 of the plurality of photonic integrated circuits may be 1.5 mm.

In some embodiments, the optoelectronic component 100 may include a first plurality of cable connectors 108. In some embodiments, each of the first plurality of cable connectors 108 may be connected to and in communication with the substrate 102, the electronic integrated circuit 104, and the photonic integrated circuit 106 via respective interconnect connectors. In other words, the first plurality of cable connectors 108 may be connected to and in communication with the substrate 102 via the plurality of substrate interconnect connectors 110, the electronic integrated circuit 104 via the plurality of electronic integrated circuit interconnect connectors 112, and the photonic integrated circuit 106 via the plurality of photonic integrated circuit interconnect connectors 114. As such, the first plurality of cable connectors 108 may be used to facilitate communication between the substrate 102, the electronic integrated circuit 104, and the photonic integrated circuit 106.

In some embodiments, the first plurality of cable connectors 108 may define a first layout. In some embodiments, the first layout may define the overall connectivity of the optoelectronic component 100. For example, with reference to FIG. 3, the connectivity defined by the first layout in the illustrated example is such that an electronic integrated circuit 304 is connected to a first photonic integrated circuit 306A and a second photonic integrated circuit 306B via cable connectors 308. In some embodiments, the first plurality of cable connectors 108 may be interchangeable with other pluralities of cable connectors that define different layouts. The different layouts may alter the overall connectivity of the optoelectronic component 100. For example, the first plurality of cable connectors 108 may be interchangeable with a second plurality of cable connectors that define a second layout which modifies the overall connectivity of the optoelectronic component 100. In this way, the optoelectronic component 100 may be easily modified to obtain desired capabilities by interchanging cable connectors.

In some embodiments, the first plurality of cable connectors 108 may be flexible. This may help ensure that the first plurality of cable connectors 108 may be used with a variety of substrates, electronic integrated circuits, and photonic integrated circuits. For example, the substrate, electronic integrated circuit, and/or photonic integrated circuit may be from different manufactures, may be a different type of integrated circuit or substrate, and/or may have different capabilities. For example, the substrate 102, electronic integrated circuit 104, and the photonic integrated circuit 106 may have different heights (e.g., height h3 of the electronic integrated circuit 104 may be greater than height h4 of the photonic integrated circuit 106). The flexibility of the first plurality of cable connectors 108 enables the first plurality of cable connectors 108 to bend as needed, such that components of the optoelectronic component 100 with different heights may be accommodated and connections may be made without any modifications to the configuration of the optoelectronic component 100 itself. Additionally, the flexibility of the first plurality of cable connectors 108 may enable the first plurality of cable connectors 108 to be used with a variety of substrates, electronic integrated circuits, and photonic integrated circuits that have interconnect connectors with different pitches. For example, if the pitch p2 of the plurality of electronic integrated circuit interconnect connectors 112 is less than the pitch p3 of the plurality of photonic integrated circuit interconnect connectors 114, the first plurality of cable connectors 108 may bend to account for the differences in pitch and connect the electronic integrated circuit 104 to the photonic integrated circuit 106.

Figure 3:
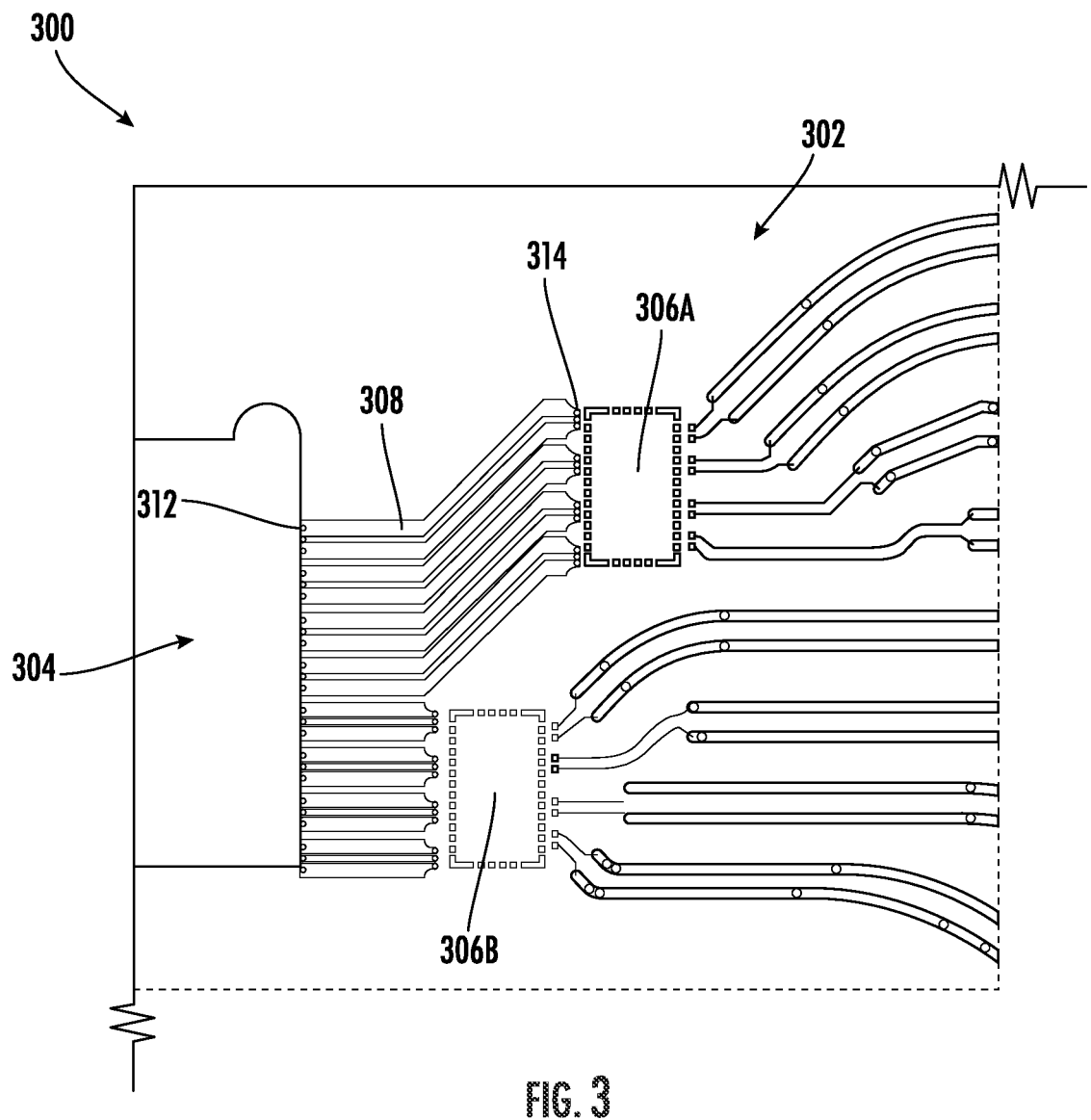
FIG. 3 illustrates an example implementation of the optoelectronic component in accordance with one or more embodiments of the present invention.

With reference to FIG. 3 a portion of an example optoelectronic component 300 is illustrated. For example, the example optoelectronic component 300 may be part of a 1.6 Tb/s demonstrator. The example optoelectronic component 300 includes a substrate 302, an electronic integrated circuit 304 supported by the substrate 302, a first photonic integrated circuit 306A supported by the substrate 302, and a second photonic integrated circuit 306B supported by the substrate 302. The example optoelectronic component 300 may include a plurality of electronic integrated circuit interconnect connectors 312 disposed on the electronic integrated circuit 304 and a plurality of photonic integrated circuit interconnect connectors 314 disposed on the first photonic integrated circuit 306A and the second photonic integrated circuit 306B. The electronic integrated circuit 304 may be connected to and in communication with the first photonic integrated circuit 306A and the second photonic integrated circuit 306B via a plurality of cable connectors 308. In the example optoelectronic component 300, the electronic integrated circuit 304 and the first photonic integrated circuit 306A are situated on the substrate 302 such that the plurality of electronic integrated circuit interconnect connectors 312 and the plurality of photonic integrated circuit interconnect connectors 314 disposed on the first photonic integrated circuit 306A are not aligned with each other (e.g., one is not disposed directly opposite to the other). In such a situation, the flexibility of the plurality of cable connectors 308 facilitating communication between the electronic integrated circuit 304 and the first photonic integrated circuit 306A may allow the electronic integrated circuit 304 and the first photonic integrated circuit 306A to be connected through manipulation of the cable connectors to accommodate the misaligned locations.

Figure 4:
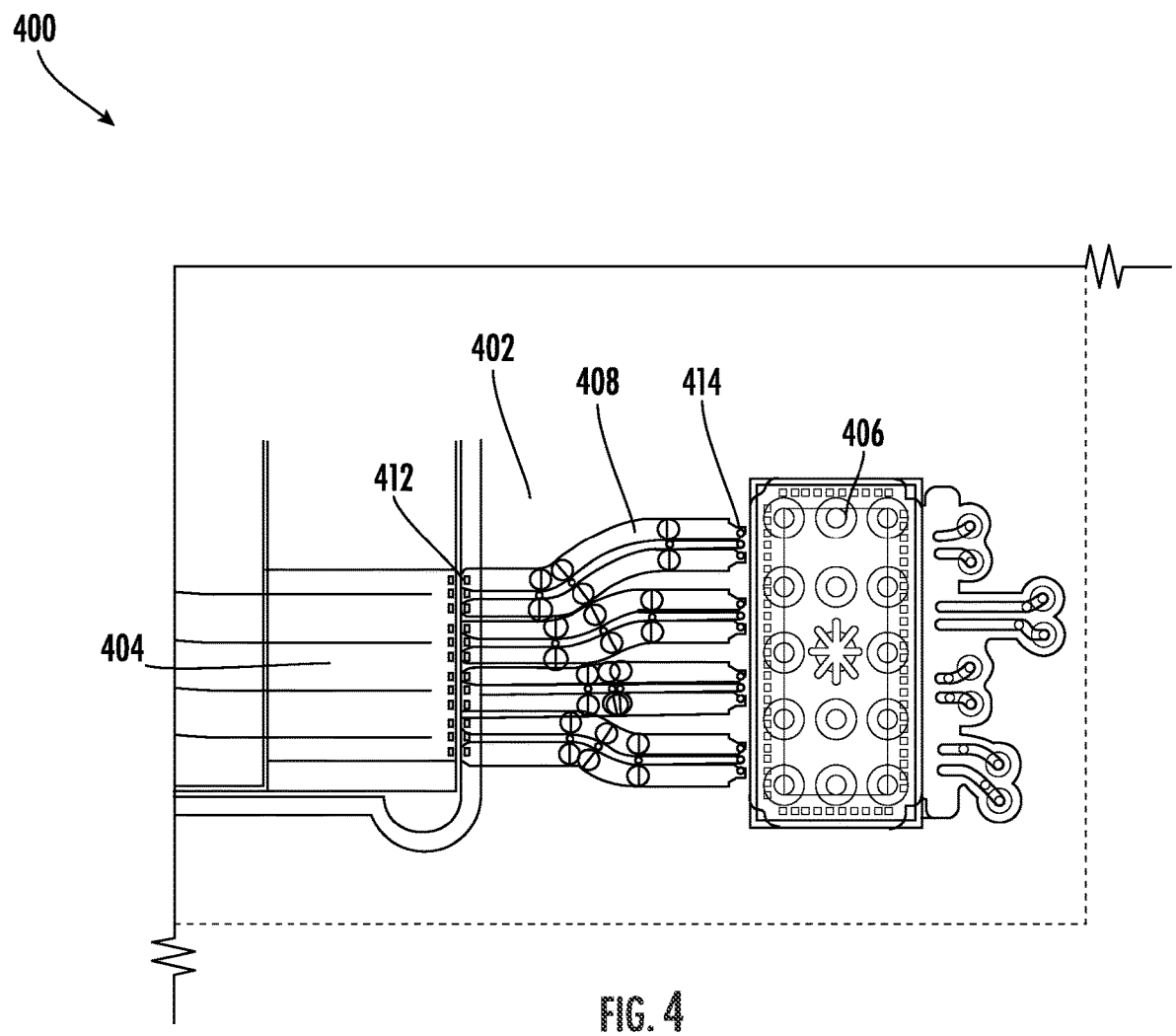
FIG. 4 illustrates another example implementation of the optoelectronic component in accordance with one or more embodiments of the present invention.

With reference to FIG. 4, another example optoelectronic component 400 is illustrated. For example, the example optoelectronic component 400 may be part of an octal small form factor pluggable (OSFP) transceiver. The example optoelectronic component 400 includes a substrate 402, an electronic integrated circuit 404 supported by the substrate 402, and a photonic integrated circuit 406 supported by the substrate 402. The example optoelectronic component 400 may include a plurality of electronic integrated circuit interconnect connectors 412 disposed on the electronic integrated circuit 404 and a plurality of photonic integrated circuit interconnect connectors 414 disposed on the photonic integrated circuit 406. The electronic integrated circuit 404 may be connected to and in communication with the photonic integrated circuit 406 via a plurality of cable connectors 408. In the example optoelectronic component 400, the pitch of the plurality of the electronic integrated circuit interconnect connectors 412 and the plurality of photonic integrated circuit interconnect connectors 414 is different. In this case, the flexibility of the plurality of cable connectors 408 facilitating communication between the electronic integrated circuit 404 and the photonic integrated circuit 406 may be such that the electronic integrated circuit 404 and the photonic integrated circuit 406 can be connected despite the differences in pitch, such as through bending or other reshaping of the cable connectors to accommodate the differences.

Example Method

Figure 5:
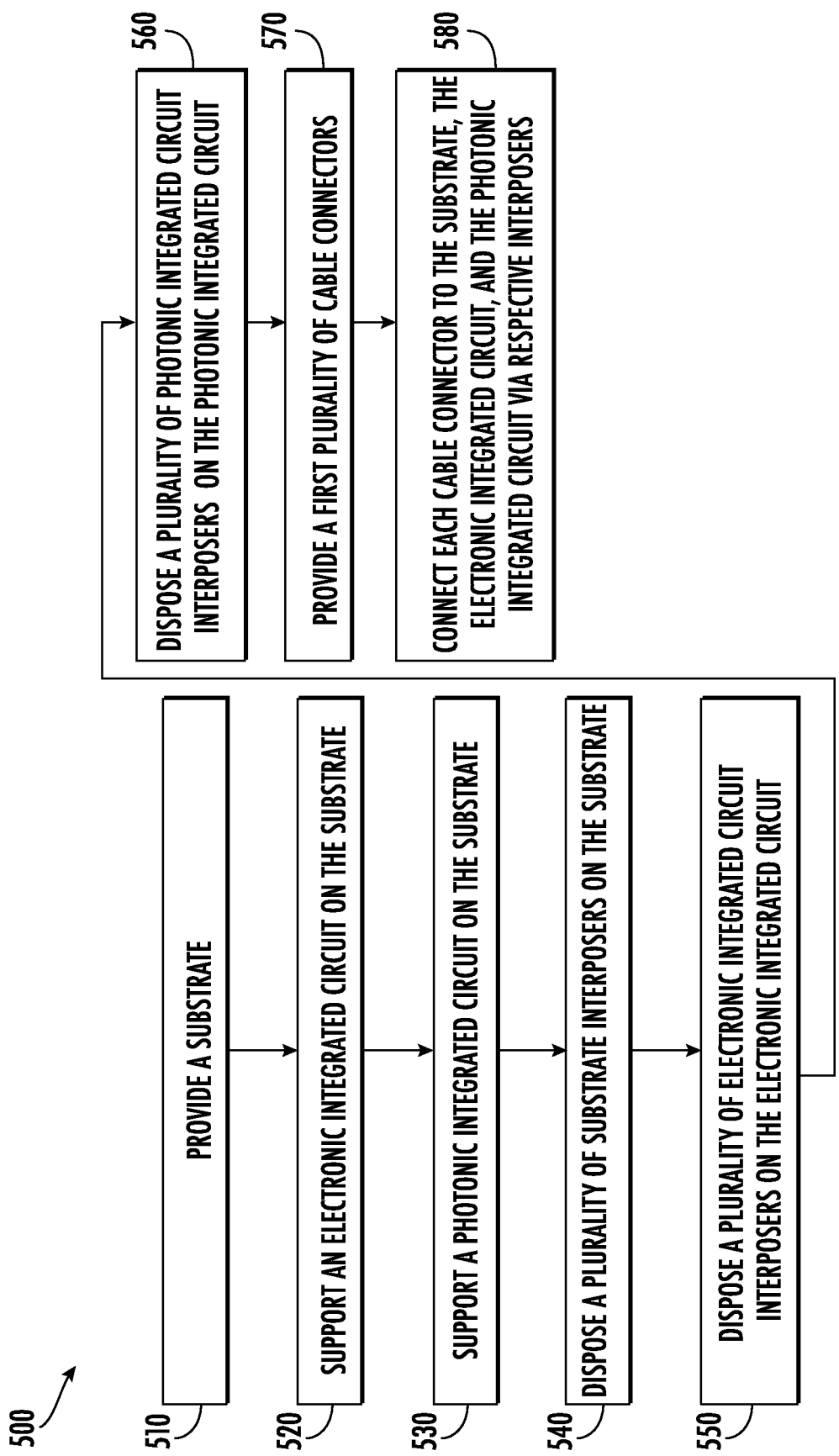
FIG. 5 illustrates a flowchart of an example method for manufacturing the optoelectronic component.

With reference to FIG. 5, a flowchart is illustrated according to an example method of manufacturing an optoelectronic component 500. As shown at block 510, the method 500 comprises providing a substrate. As shown at block 520, the method 500 comprises supporting an electronic integrated circuit on the substrate. As shown at block 530, the method 500 comprises supporting a photonic integrated circuit on the substrate. As shown at block 540, the method 500 comprises disposing a plurality of substrate interconnect connectors on the substrate. As shown at block 550, the method 500 comprises disposing a plurality of electronic integrated circuit interconnect connectors on the electronic integrated circuit. As shown at block 560, the method 500 comprises disposing a plurality of photonic integrated circuit interconnect connectors on the photonic integrated circuit. As shown at block 570, the method 500 comprises providing a first plurality of cable connectors. As shown at block 580, the method 500 comprises connecting each cable connector to the substrate, the electronic integrated circuit, and the photonic integrated circuit via respective interconnect connectors. In some embodiments, first plurality of cable connectors may be configured to facilitate electrical communication between the substrate, the electronic integrated circuit, and the photonic integrated circuit. In some embodiments, the first plurality of cable connectors defines a first layout. In some embodiments, an overall connectivity of the optoelectronic component corresponds to the first layout. Accordingly, the example method of manufacturing an optoelectronic component enables the manufacture of an optoelectronic component with substrates, electronic integrated circuits, and photonic integrated circuits having different pitches, heights, and alignments by altering only the plurality of cable connectors. Additionally, cable connectors with different layouts may be used interchangeably to alter the overall connectivity of the optoelectronic component.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optoelectronic component comprising:
   a substrate;
   an electronic integrated circuit supported by the substrate;
   a photonic integrated circuit supported by the substrate;
   a plurality of substrate interconnect connectors disposed on the substrate;
   a plurality of electronic integrated circuit interconnect connectors disposed on the electronic integrated circuit;
   a plurality of photonic integrated circuit interconnect connectors disposed on the photonic integrated circuit; and
   a first plurality of interchangeable cable connectors disposed on the photonic integrated circuit and the electronic integrated circuit, each interchangeable cable connector connected to the substrate, the electronic integrated circuit, and the photonic integrated circuit via respective interconnect connectors, wherein the first plurality of interchangeable cable connectors is configured to facilitate electrical communication between the substrate, the electronic integrated circuit, and the photonic integrated circuit, wherein the first plurality of interchangeable cable connectors defines a first layout, and wherein an overall connectivity of the optoelectronic component corresponds to the first layout.

2. The optoelectronic component of claim 1, wherein the substrate is a printed circuit board.

3. The optoelectronic component of claim 1, wherein the first plurality of interchangeable cable connectors is flexible.

4. The optoelectronic component of claim 1, wherein the photonic integrated circuit comprises graphene.

5. The optoelectronic component of claim 1, wherein the electronic integrated circuit comprises a digital signal processor.

6. The optoelectronic component of claim 1, wherein the photonic integrated circuit comprises one of a transmitter optical sub assembly or a receiver optical sub assembly.

7. The optoelectronic component of claim 1, wherein a second plurality of interchangeable cable connectors is used in place of the first plurality of interchangeable cable connectors to define a second layout, and wherein the overall connectivity of the optoelectronic component corresponds to the second layout.

8. The optoelectronic component of claim 1, wherein the plurality of electronic integrated circuit interconnect connectors has a first pitch and the plurality of photonic integrated circuit interconnect connectors has a second pitch.

9. The optoelectronic component of claim 8, wherein the first pitch is different from the second pitch.

10. The optoelectronic component of claim 1, wherein the electronic integrated circuit has a first height and the photonic integrated circuit has a second height, wherein the first height and the second height are different.

11. The optoelectronic component of claim 1, wherein each of the plurality of substrate interconnect connectors, the plurality of electronic integrated circuit interconnect connectors, and the plurality of photonic integrated circuit interconnect connectors is flexible.

12. The optoelectronic component according to claim 1, wherein the first plurality of interchangeable cable connectors are moveable with respect to the photonic integrated circuit and the electronic integrated circuit.

13. A method of manufacturing an optoelectronic component, the method comprising:
providing a substrate;
supporting an electronic integrated circuit on the substrate;
supporting a photonic integrated circuit on the substrate;
disposing a plurality of substrate interconnect connectors on the substrate;
disposing a plurality of electronic integrated circuit interconnect connectors on the electronic integrated circuit;
disposing a plurality of photonic integrated circuit interconnect connectors on the photonic integrated circuit;
providing a first plurality of interchangeable cable connectors disposed on the photonic integrated circuit and the electronic integrated circuit; and
connecting each interchangeable cable connector to the substrate, the electronic integrated circuit, and the photonic integrated circuit via respective interconnect connectors, wherein the first plurality of interchangeable cable connectors is configured to facilitate electrical communication between the substrate, the electronic integrated circuit, and the photonic integrated circuit, wherein the first plurality of interchangeable cable connectors defines a first layout, and wherein an overall connectivity of the optoelectronic component corresponds to the first layout.

14. The method of claim 13, wherein the substrate is a printed circuit board.

15. The method of claim 13, wherein the first plurality of interchangeable cable connectors is flexible.

16. The method of claim 13, wherein the photonic integrated circuit comprises graphene.

17. The method of claim 13, wherein the electronic integrated circuit comprises a digital signal processor.

18. The method of claim 13, wherein the photonic integrated circuit comprises one of a transmitter optical sub assembly or a receiver optical sub assembly.

19. The method of claim 13, wherein a second plurality of interchangeable cable connectors is used in place of the first plurality of interchangeable cable connectors to define a second layout, and wherein the overall connectivity of the optoelectronic component corresponds to the second layout.

20. The method of claim 13, wherein the plurality of electronic integrated circuit interconnect connectors has a first pitch and the plurality of photonic integrated circuit interconnect connectors has a second pitch.

21. The method of claim 20, wherein the first pitch is different from the second pitch.

22. The method of claim 13, wherein the electronic integrated circuit has a first height and the photonic integrated circuit has a second height, wherein the first height and the second height are different.

23. The method of claim 13, wherein each of the plurality of substrate interconnect connectors, the plurality of electronic integrated circuit interconnect connectors, and the plurality of photonic integrated circuit interconnect connectors is flexible.

* * * * *